(12) United States Patent
Moorthy et al.

(10) Patent No.: US 7,305,191 B2
(45) Date of Patent: Dec. 4, 2007

(54) OPTICAL CORRELATOR SYSTEM AND SUPPORTING METHOD AND APPARATUS

(75) Inventors: Deepa Moorthy, Arlington Heights, IL (US); Asad Aman, Roselle, IL (US)

(73) Assignee: Motorola, Inc., Schaumburg, IL (US)

( * ) Notice: Subject to any disclaimer, the term of this patent is extended or adjusted under 35 U.S.C. 154(b) by 586 days.

(21) Appl. No.: 10/668,029

(22) Filed: Sep. 22, 2003

(65) Prior Publication Data

US 2005/0063705 A1    Mar. 24, 2005

(51) Int. Cl.
*H04B 10/06* (2006.01)
*H04B 1/00* (2006.01)
(52) U.S. Cl. ...................................... 398/212; 375/150
(58) Field of Classification Search ................ 398/207, 398/212; 375/150
See application file for complete search history.

(56) References Cited

U.S. PATENT DOCUMENTS

| 5,274,716 | A | * | 12/1993 | Mitsuoka et al. ............ 382/210 |
| 5,760,941 | A |   | 6/1998  | Young et al. |
| 6,137,612 | A | * | 10/2000 | Startup ........................ 398/199 |
| 6,259,614 | B1 | * | 7/2001 | Ribarich et al. .............. 363/89 |
| 6,570,708 | B1 | * | 5/2003 | Bergeron et al. ........... 359/559 |
| 6,972,905 | B2 | * | 12/2005 | Ludwig ....................... 359/559 |
| 2002/0126644 | A1 | * | 9/2002 | Turpin et al. ................ 370/342 |
| 2003/0020990 | A1 | * | 1/2003 | Courtois et al. ............. 359/161 |

OTHER PUBLICATIONS

Benjamin, R. et al.: Optical beam forming techniques for phased array antennas, IEE Proceedings-H, vol. 139, No. 6, Dec. 1992, pp. 526-534.

Shibata, Osamu et al.: Spatial Optical Beam-Forming Network for Receiving-Mode Multibeam Array Antenna-Proposal and Experiment, IEEE Transactions on Microwave Theory and Techniques, vol. 50, No. 5, May 2002, pp. 1425-1430.

Ogawa, Ikuo et al.: Two-Dimensional Multiple Beam Forming Using Slab-Waveguide-Implemented Photonic Beam Forming Network, WE3-2, NTT Wireless Systems Laboratories, 1-2356 Take, Yokosuka-shi, Kanagawa-ken 238-03, Japan, pp. 197-200.

Konishi, Yoshihiko: Carrier-to-Noise Ratio and Sidelobe Level in a Two-Laser Model Optically Controlled Array Antenna Using Fourier Optics, IEEE Transactions on Antennas and Propagation, vol. 40, No. 12, Dec. 1992, pp. 11459-11465.

O'Farrell, T. and S.I. Lochmann. 1994. "*Optical Correlator Recievers for SIK DS-CDMA Communication Systems*", Asian Institute of Technology (pp. 584-587).

* cited by examiner

*Primary Examiner*—Shi K. Li

(57) ABSTRACT

Multiple electrical signals (from, for example, multiple signal sources such as antennas) are converted by an electrical signal input (24) into corresponding optical signals. In one embodiment these electrical signals are comprised of temporally separated data elements. In this case, in a preferred embodiment, the optical signals mirror these temporal conditions. In addition, in a preferred approach, the optical signals are physically grouped such that temporally coincident data elements from each of the multiple electrical signals are positioned proximal to one another. The resultant optical signals are then correlated, in parallel, with a correlation reference (26) by an optical correlator lens (25). In one embodiment, the optical signals are subjected to a Fourier transformation (31) and distorted (32) as necessary to normalize these resultant optical signals with the correlation reference (26). The optical correlation then occurs in the Fourier domain.

28 Claims, 4 Drawing Sheets

OPTICAL CORRELATOR SYSTEM AND SUPPORTING METHOD AND APPARATUS

TECHNICAL FIELD

This invention relates generally to conversion to, conversion from, and manipulation of optical signals.

BACKGROUND

Radio frequency receivers are well known in the art. For example, many code division multiple access (CDMA) radio frequency receivers serve to receive a transmitted signal (or signals) and then utilize multi-path searching techniques to detect a desired transmission. In many such applications multiple antennas are used for reception. Received signals from each antenna are correlated with a despreading code to effect detection of a desired signal. Such correlation, however, comprises a time domain-based serial process that includes correlating received data samples against the reference signal, integrating the correlation results over time, and then detecting the correlation peaks.

Such multi-path searching tends to be computationally intensive. This presents particular problems when attempting to scale a receiver to effect parallel (or near-parallel) processing of multiple signals (as may be provided by, for example, multiple antennas). As a result, it typically becomes quickly non-feasible (either due to technical and/or commercial limitations due, in large part, to the need to provide and utilize additional hardware resources) to use, for example, multiple antennas with a CDMA receiver notwithstanding the performance improvements that one might otherwise expect and desire.

BRIEF DESCRIPTION OF THE DRAWINGS

The above needs are at least partially met through provision of the optical correlator system and supporting method and apparatus described in the following detailed description, particularly when studied in conjunction with the drawings, wherein.

Figure 1:
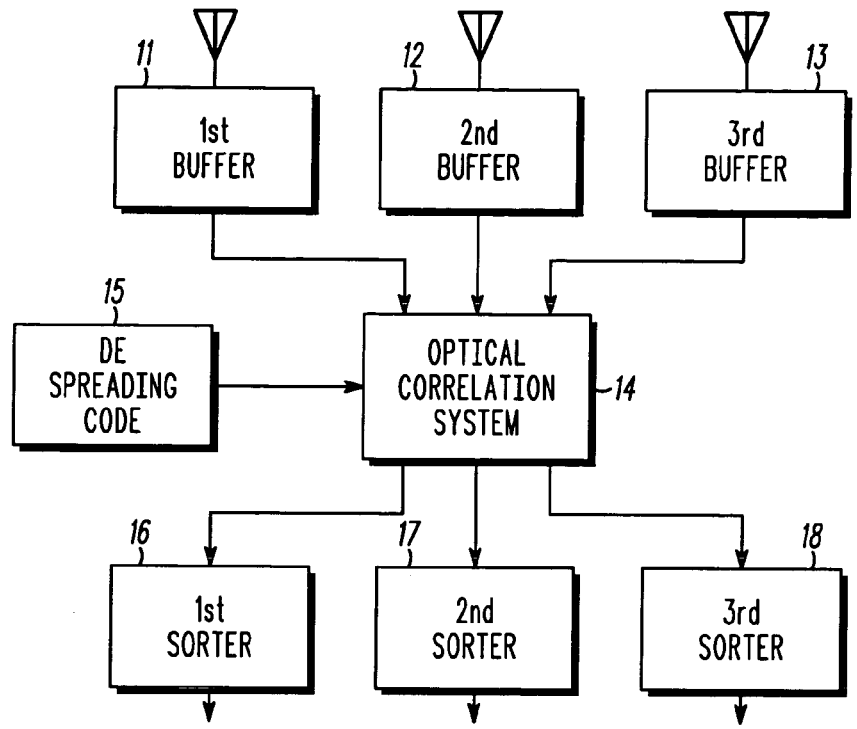
FIG. 1 comprises a block diagram of a portion of a multiple-antenna receiver as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, electrical signals (typically as correspond to two or more data sources) are converted to corresponding optical signals. Those optical signals are then optically correlated with a correlation reference to provide resultant corresponding correlation results. A plurality of signals can be simultaneously correlated in the optical domain in a highly scalable fashion. In one embodiment the results are then converted back to the electrical domain and processed or utilized as desired.

Pursuant to some embodiments, an electrical signal input receives at least a first and a second electrical signal and converts them to corresponding first and second optical signals that are borne by a first and second carrier wavelength, respectively. An optical correlator receives both the first and second optical signals and provides an output that simultaneously comprises a first correlation result optical signal that corresponds to an amount of correlation as between the first optical signal and a correlation reference and a second correlation result optical signal that corresponds to an amount of correlation as between the second optical signal and that same correlation reference.

In one embodiment, the optical signals are ported through a modified Fourier lens to thereby permit correlation in the Fourier domain. A Fourier distorter can be employed to rescale the optical signals (which have carrier wavelengths that vary from one another) to thereby accord with the correlation reference that is used simultaneously with both optical signals to perform the correlation activity. Subsequent to optical correlation, the correlation results can again be distorted as necessary to return them to an undistorted configuration. Following this, the now-undistorted correlation results can be passed through an inverse Fourier lens and then converted to electrical signal counterparts.

Pursuant to a preferred embodiment, the incoming electrical signal-borne data is buffered and then converted into optical counterparts and processed in parallel in batches. So configured, the time domain information necessary to permit the Fourier processing suggested above is provided. By optically representing and spatially grouping temporally related data elements from differing inputs, parallel processing of the various multiple signal sources through a single optical correlator is facilitated.

Pursuant to such embodiments, a cost effective and reliable correlation mechanism can be provided. This mechanism scales relatively easily to accommodate a considerable number of signal sources without requiring a concurrent matching provision of hardware resources to support the correlation platform. This, in turn, permits a CDMA receiver, for example, to make use of a plurality of antennas while nevertheless complying with other design constraints regarding such factors as cost, form factor, power consumption, and the like. Many other applications can also likely make use of such capability and capacity.

Referring now to the drawings, and in particular to FIG. 1, in this example, three antennas each serve to individually receive a wireless signal. Samples of the corresponding electrical signal are stored in a corresponding buffer 11, 12, and 13. If desired, a complete transmission can be received and buffered in this manner before further processing, but in a preferred embodiment the contents of the buffers will be batch processed from time to time to effect substantially real-time processing of the received signals. For example, twelve consecutively received data elements can be provided in a single batch from each buffer (it will be understood that virtually any other number of samples can be utilized as desired and/or as appropriate to a given application).

In this embodiment, the receiver comprises a CDMA receiver. Consequently, the received signals are to be correlated against a correlation reference comprising a despreading code 15. In particular, in this embodiment, an optical correlation system 14 receives the buffered signals, converts them to corresponding optical signals, and correlates those optical signals with the despreading code 15. The results of the correlation activity are then re-converted to electrical signals and provided to corresponding sorters 16, 17, 18. (CDMA receivers in general and the use and application of despreading codes and sorters in particular are well understood in the art. Therefore, additional description in that regard will not be provided here for the sake of brevity and the preservation of focus.

So configured, a single optical correlation system 14 making use of multiple optical wavelengths to bear discrete signal streams can serve to effect a correlation function, in parallel, for a plurality of incoming signals. In this embodiment three such signal sources are shown. As will be made more clear below, anywhere from two to some considerably larger number of signal sources can be accommodated with these teachings.

Figure 2:
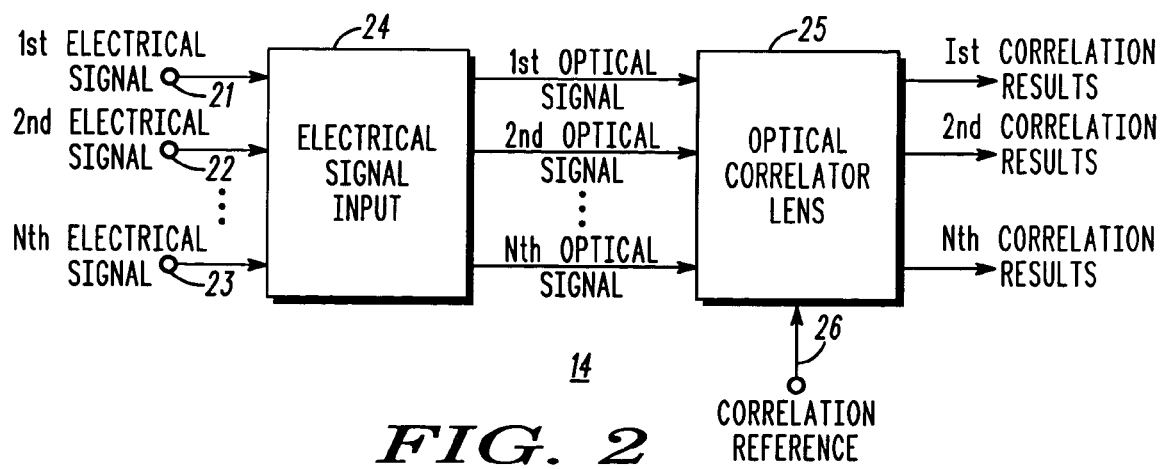
FIG. 2 comprises a high-level block diagram of an optical correlator system as configured in accordance with various embodiments of the invention.

Referring now to FIG. 2, the optical correlation system 14 can be generally comprised of an electrical signal input 24 and an optical correlator lens 25. The electrical signal input 24 has a first input 21, a second input 22, and up to an Nth input 23 to receive a first electrical signal, a second electrical signal, and an Nth electrical signal respectively. As noted before, there can be two or more such discrete input signal streams as appropriate to a given application. The electrical signal input 24 converts each electrical signal into a corresponding optical signal, wherein each optical signal is characterized by a different optical carrier wavelength. For example, a first optical signal as corresponds to the first electrical signal can have a first optical carrier wavelength $\lambda_1$, while the second optical signal as corresponds to the second electrical signal can have a second, different optical carrier wavelength $\lambda_2$. As is well understood in the art, these optical carriers are modulated to thereby bear the data that comprises the electrical signals. For example, light pulses that represent the electrical signals can have an intensity that correlates to the amplitude of the corresponding electrical signal.

In this embodiment the optical signals are then provided to the optical correlator lens 25. The optical correlator 25 lens receives these optical signals and provides corresponding outputs that comprise correlation results that correspond to an amount of correlation as between the optical signals and a correlation reference 26. The correlation reference 26 can be, for example, a reference signal signature such as, but not limited to, a code division multiple access despreading code. The optical correlator lens 25 itself can preferably comprise an optical correlator filter that filters the first and second optical signals as a function, at least in part, of the correlation reference.

Figure 3:
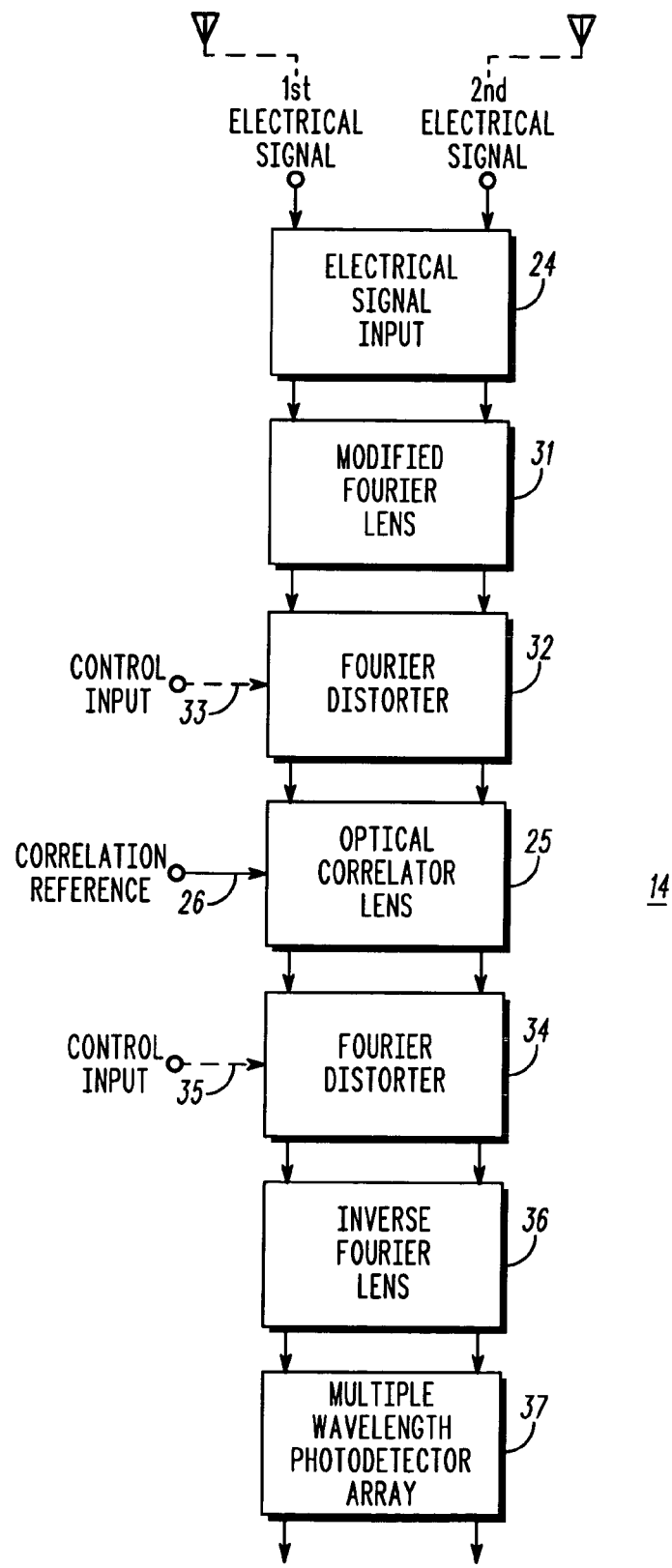
FIG. 3 comprises a block diagram of an optical correlator system as configured in accordance with various embodiments of the invention.

Referring now to FIG. 3, additional description of various embodiments of an optical correlation system 14 will be provided. In this embodiment, only two signal sources are shown for the sake of clarity and simplicity, but again it should be understood that considerably more discrete signal streams can be accommodated by these teachings if desired. These two signal sources comprise a first radio frequency antenna and a second radio frequency antenna that provide first and second electrical signals, respectively. For purposes of this illustration, these received signals are CDMA signals. Consequently, each of the electrical signals comprises a set of data wherein the sets of data each correspond to a transmission as received by a corresponding antenna and wherein the sets of data each preferably corresponds to a transmission that includes a spreading code as well understood in the art.

An electrical signal input 24 receives these electrical signals and converts them to corresponding optical signals. In a preferred embodiment, the electrical signal input 24 comprises an emissive multiple wavelength spatial light modulator. This modulator preferably has an input operably coupled to receive the electrical signals and an output that provides a corresponding plurality of optical signals. In a preferred embodiment, each optical signal has a carrier wavelength that is unique to a given one of the electrical signals (and hence, in this illustration, to a corresponding one of the signal sources).

Figure 4:
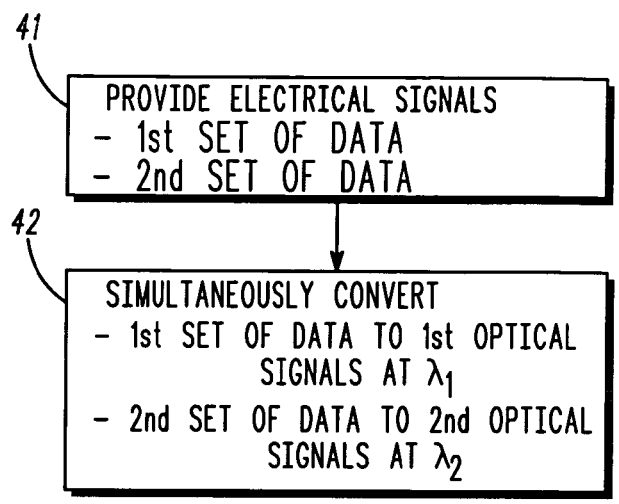
FIG. 4 comprises a flow diagram as configured in accordance with an embodiment of the invention.

As already noted above, and referring momentarily to FIG. 4, in a preferred embodiment, the incoming electrical signals comprise temporally dispersed data elements as are provided in batches from, for example, one or more buffers. These batched sets of data are provided 41 to the electrical signal input and are then simultaneously converted 42 into corresponding optical signals having differentiated optical carrier wavelengths. To carry forward with the illustrative example presented above, the buffer(s) may provide twelve temporally dispersed data elements for each of the data sets (again with the understanding that this particular number has been chosen for purposes of illustration only and with virtually any other number of data elements being potentially suitable). In a preferred embodiment, these twelve temporally dispersed data elements will comprise sequentially sampled segments of the incoming received transmission. Also in a preferred embodiment, when simultaneously converting 42 the electrical signals into optical signals, the optical signals are proximally physically grouped as a function of the temporal correspondence of the data elements that correspond to the optical signals, such that optical signals of the first and second optical signals that correspond to data elements that represent a substantially common point in time are grouped together.

Figure 5:
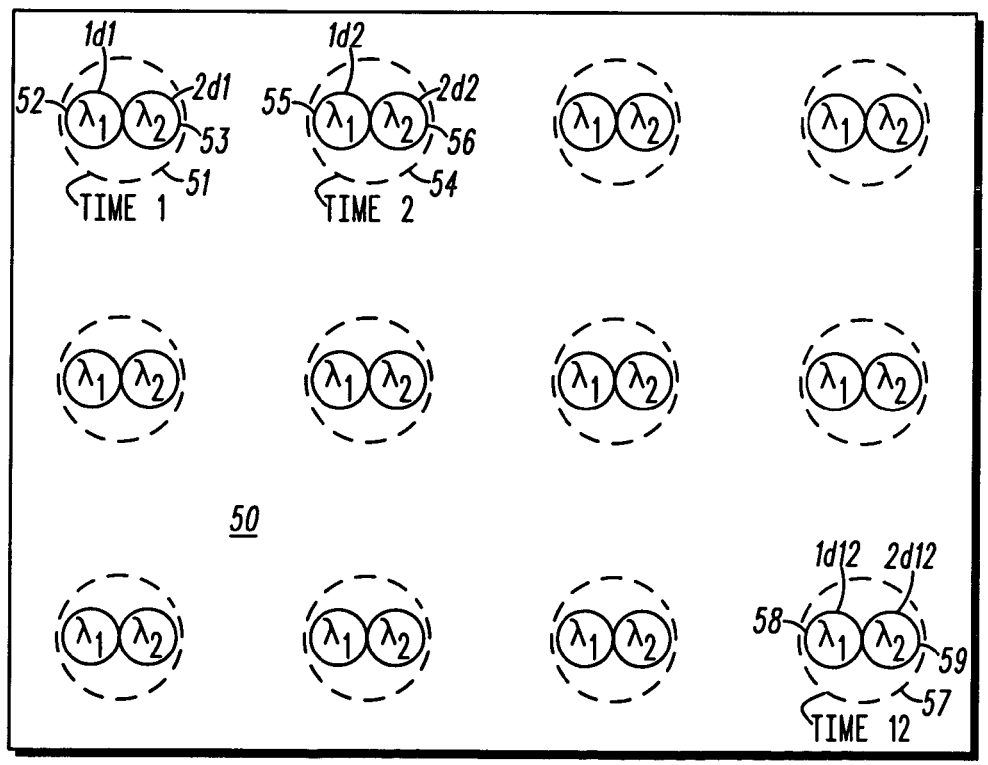
FIG. 5 comprises a side elevational schematic view of an electrical signal input as configured in accordance with various embodiments of the invention.

An emissive multiple wavelength spatial light modulator 50 suitable to support such an approach is schematically depicted in FIG. 5. To again continue the earlier illustrative example wherein batches of twelve data points are provided for each incoming data stream, here a four by three array of grouped optically emissive elements is provided. In particular, twelve super-pixels are provided, with each super-pixel being comprised of two optically emissive elements. For example, a first super-pixel 51 is comprised of a first optically emissive element 52 and a second optically emissive element 53. In this embodiment, each optically emissive element comprises a light emitting diode. In this embodiment, the first optically emissive element for each super-pixel corresponds to the optical signals for the first electrical signal and the second optically emissive element for each super-pixel corresponds to the optical signals for the second electrical signal.

As noted above, the optical signals for each electrical signal use a different optical carrier wavelength. Accordingly, the first optically emissive element for each super-pixel emits light having a first carrier wavelength $\lambda_1$ and the second optically emissive element for each super-pixel emits light having a second, different carrier wavelength $\lambda_2$.

Also as noted above, the optical signals that represent temporally coincident data elements are grouped together.

Therefore, in this embodiment, the first super-pixel 51 corresponds to a first time 1. Accordingly, the first optically emissive element 52 corresponds to a first data element 1*d*1 for the first data stream (as may correspond, for example, to the received signal from the first antenna) where 1*d*1 represents the first data stream sample at time 1. Similarly, the second optically emissive element 53 corresponds to the first data element 2*d*1 for the second data stream (as may correspond, for example, to the received signal from the second antenna) where first data element 2*d*1 represents the second data stream sample at time 1.

In similar fashion, the second super-pixel 54 has a first optically emissive element 55 that corresponds to a second data element 1*d*2 for the first data stream where 1*d*2 represents the first data stream sample at time 2 and a second optically emissive element 56 that corresponds to the second data element 2*d*2 for the second data stream where 2*d*2 represents the second data stream sample at time 2. This arrangement preferably prevails through to the final super-pixel 57, which has a first optically emissive element 58 that corresponds to a twelfth data element d12 for the first data stream (as corresponds to the first data stream at time 12) and a second optically emissive element 59 that corresponds to the twelfth data element d12 for the second data stream (as corresponds to the second data stream at time 12).

It can therefore be seen that the electrical signal input can receive, in parallel, a batch of temporally successive data elements for a plurality of data streams. These data elements are converted into optical signals (where, for example, the intensity of the optical signal varies in correspondence to the amplitude of the information represented by the individual data elements). These optical signals are physically grouped such that temporally coincident data elements are configured in close proximity to one another. Although temporally related optical signals are positioned close to one another, they are nevertheless readily distinguishable from one another because the optical signals use different optical carrier wavelengths to distinguish between the different signal sources.

It will be appreciated that although the super-pixels in this illustrative embodiment each comprise only two optically emissive elements, in fact more optically emissive elements can be provided to accommodate, for example, an increased number of signal sources. It will also be appreciated that although the super-pixels in this illustrative embodiment are depicted in a simple four by three array, other configurations can be utilized and may in fact be preferable to suit the needs of a given application context. And, again, it should be understood that more or fewer super-pixels can be provided as desired to suit the various design requirements of a given application.

Referring again to FIG. 3, the optical signals provided by the electrical signal input 24 are then preferably passed through a modified Fourier lens 31. In a preferred approach, this modified Fourier lens 31 comprises a substantially flat optical element that is characterized by unity transmittance and that is disposed optically upstream of a Fourier lens. The latter has an optical output that provides corresponding Fourier domain optical output signals. Such lenses are well known in the art as is the practice of Fourier-based optics in general. Therefore, additional description of such a lens will not be provided here save to note that the Fourier lens serves to focus the individual plane waves of the incoming optical signals to a corresponding single point.

The modified Fourier lens 31, being a lens, functions by bending incoming light. The degree of the resultant bending of the incoming light will vary depending upon the wavelength of the light itself. Since the incoming optical signals have differing wavelengths (that is, the optical signals for the first signal source use a first optical carrier wavelength and the optical signals for the second signal source use a second, different optical carrier wavelength), these optical signals will be bent in different ways when traversing the modified Fourier lens 31. As a result, although the optical signals were originally grouped to position temporally coincident data elements proximal to one another, these originally proximal optical signals will typically be moved further apart as they pass through the modified Fourier lens 31. This physical displacement may lead to inaccurate subsequent processing of the optical signals (and particularly so when looking to process a plurality of optical signals, in parallel, with respect to a single correlation reference using a single optical correlator).

To meet this circumstance, a Fourier distorter 32 can be positioned to receive the Fourier domain optical output signals and to provide corresponding distorted Fourier domain optical output signals. In particular, the Fourier distorter 32 will preferably be positioned between the modified Fourier lens 31 and the optical correlator lens 25. So configured, the Fourier distorter 32 receives a plurality of sets of optical signals that represent spectral domain representations of a corresponding plurality of sets of temporally distributed data elements (wherein each of the plurality of sets of optical signals has a unique carrier wavelength as compared to others of the plurality of sets of optical signals) and optically distorts at least some of the optical signals to effectively normalize the spectral domain representations with respect to the correlation reference. To put it simply, the Fourier distorter 32 effectively repositions the Fourier transformed optical signals to again physically group the temporally associated data elements. In a preferred embodiment, this regrouping effects such repositioning in a manner that establishes comparability (or normalization) of the temporally associated data elements with correlation reference information and thereby removes the effect of the previous spatial scaling due to multiple wavelengths.

In one embodiment, all of the signals are distorted to some degree in order to achieve the desired spatial equivalence. So configured, all of the optical signals are moved from a present physical location respective one another to effect the desired repositioning. In another embodiment, all of the signals save one are distorted in this fashion. So configured, the distorted signals are moved to locations that are coincident with, and hence normalized with respect to, the undistorted signal. In either case, the final degree of distortion should preferably substantially match and correlate with that which is otherwise called for by the wavelength of the reference signal.

In general, in a preferred embodiment, a separate lens can be used to achieve the desired degree of distortion for each optical signal (thereby typically requiring a plurality of distorting lenses to achieve the desired end result). For many embodiments, it may be helpful to utilize carrier wavelengths that are considerably different from one another such that a distorting lens can be provided for each optical signal that is otherwise relatively transparent to the remaining optical signals.

For some applications, the Fourier distorter 32 can comprise an optical pathway having fixed pathway characteristics. This may be particularly appropriate when dealing with relatively fixed operating parameters and conditions. For other applications, the Fourier distorter 32 may comprise a dynamically alterable distortion parameter Fourier distorter having, for example, a corresponding control input 33. This can include the capability of automatically adjusting the dynamically alterable distortion parameter to thereby dynamically normalize the spectral domain representations with respect to the correlation reference. For example, optical path length may be controlled using controllable nano-mirrors or micro-mirrors.

The resultant optical signals are then provided to the optical correlator lens 25. The optical correlator lens 25 serves to determine correlation between the various incoming optical signals and a correlation reference 26 (the latter comprising, in this example, a despreading CDMA code). A single correlation reference 26 can be successfully utilized to ascertain, in parallel, a degree of correlation with a plurality of incoming signals. More particularly, the optical correlator lens 25 comprises an optical correlator filter that is driven by the Fourier transform of, in this case, a correlation reference 26 against which the incoming signal stream samples for each antenna are correlated. Optical Fourier correlation is generally understood in the art and hence additional detailed description need not be provided here.

When the pre-correlated signals have been subjected to distortion as described above, it may then be useful to against distort the correlation results to effectively un-distort (or de-distort) the signals and thereby undo the previous scaling effect and suitably diverge the correlation results. As with the previously described Fourier distorter 32, this Fourier distorter 34 can be either a fixed pathway element (or elements) or a dynamically controlled mechanism having one or more control inputs 35.

An inverse Fourier lens 36 then receives the spatially restored correlation results for each optical signal and effects an inverse Fourier transformation.

At this point, the results of the correlation process are now available in a time domain representation. If desired, other optical processing can be employed as possible or appropriate. Or, if desired, the optical results can be converted again to electrical signals to permit further processing via electrically-based logic circuits and the like. To facilitate the latter approach, a multiple wavelength photodetector array 37 can be utilized to convert the plurality of optical signals into their counterpart electrical signals. Pursuant to one embodiment, this array 37 can essentially comprise the opposite of the emissive multiple wavelength spatial light modulator as was described above.

Figure 6:
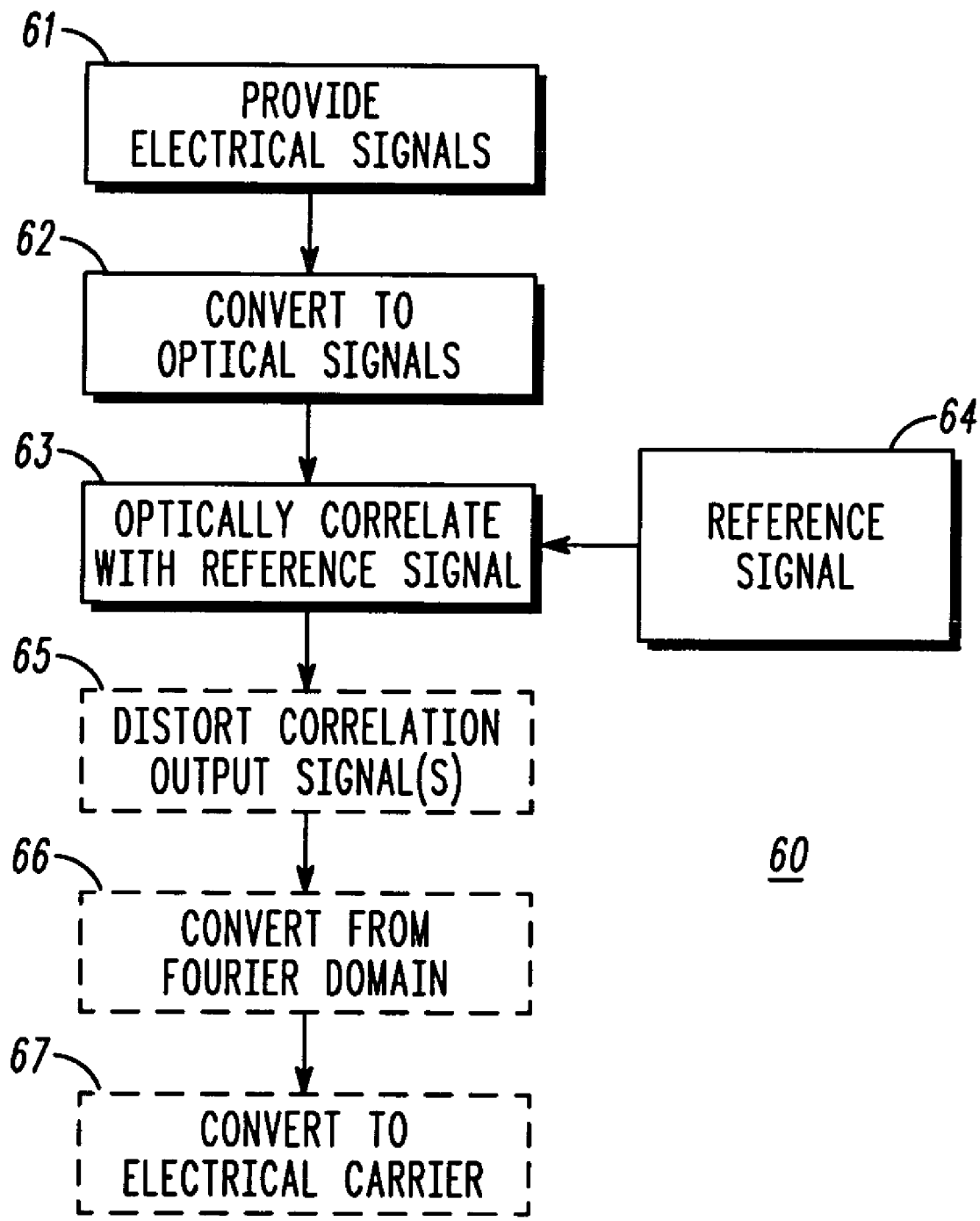
FIG. 6 comprises a flow diagram as configured in accordance with various embodiments of the invention.

Referring now to FIG. 6, platforms such as those described above, and other platforms as may be presently known or hereafter developed, can serve to effect a process 60 where electrical signals are provided 61 and converted 62 to corresponding optical signals. In one embodiment, the electrical signals are comprised of temporally differentiated samples and the optical signals are likewise comprised of a plurality of temporally differentiated optical signals. Depending upon the needs of the application, this conversion activity can also include passing the optical signals through a Fourier lens to provide Fourier transformed optical signals, at least some of which optical signals are then distorted as necessary (to achieve normalization with respect to a reference signal). The process 60 then optically correlates 63 these optical signals with a reference signal 64. In one embodiment, the reference signal 64 can comprise a Fourier representation of a time-based signal. Pursuant to this correlation, one can determine how closely the incoming signals correlate to the reference signal.

Depending upon the needs of the application, and particularly likely depending upon whether the optical signals were previously intentionally or unintentionally distorted, the optical correlation results can be distorted 65 to thereby correct the spatial characteristics thereof. That is, the distorted outputs signals of this step are, in fact, substantially undistorted (or de-distorted) when viewed with respect to their original form. One can also optionally convert 66 the correlation results from the Fourier domain. And, finally, one can also optionally convert 67 the optical carriers (and their corresponding data load) to corresponding electrical carriers.

So configured, correlation with a given user signature can be accomplished in a highly scalable fashion due, in large part, to the reduced computational complexity of this approach. In particular, the parallelism achieved by representing data in the optical domain and by performing the correlation in the Fourier domain instead of the time domain aids in achieving this beneficial flexibility. This scalability includes flexibility with respect to the number of signal sources. This benefit derives in part from the representation of data from the varied signal sources with different optical wavelengths. This, in turn, permits optical processing without requiring extensive parallel hardware support.

These embodiments also lend themselves to high levels of integration. For example, recent advancements permit gallium arsenide components (which are often useful for rendering optical mechanisms) and silicon components (which are often useful for rendering electrical circuits and corresponding processing and logic platform) to share a common substrate. Such a platform would well support the electrically-based and optically-based components and elements described herein in a cost effective, highly integrated, relatively small, power efficient form factor.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   at least a first electrical signal input received from a first antenna, the first electrical signal having at least a first output providing a first optical signal characterized by a first carrier wavelength, wherein the first optical signal corresponds to a first electrical signal;
   at least a second electrical signal input received from a second antenna, the second electrical signal having at least a second output providing a second optical signal characterized by a second carrier wavelength that is different than the first carrier wavelength, wherein the second optical signal corresponds to a second electrical signal; and
   an optical correlator that receives at least the first and second optical signal and that has an output at least simultaneously comprising:
      a first correlation result optical signal that corresponds to an amount of correlation between the first optical signal and a correlation reference; and
      a second correlation result optical signal that corresponds to an amount of correlation between the second optical signal and the correlation reference.

2. The apparatus of claim 1 wherein the optical correlator comprises optical correlator filter means for filtering the first and second optical signals as a function, at least in part, of the correlation reference.

3. The apparatus of claim 2 wherein the correlation reference comprises a reference signal signature.

4. The apparatus of claim 3 wherein the reference signal signature comprises a code division multiple access despreading code.

5. The apparatus of claim 1 and further comprising a flat lens having unity transmittance and that is disposed optically upstream of a Fourier lens disposed between the first and second electrical signal input and the first and second output.

6. The apparatus of claim 5 and further comprising at least one Fourier distorter disposed between the Fourier lens and the optical correlator.

7. The apparatus of claim 6 wherein the at least one Fourier distorter comprises at least one of:
a fixed distortion parameter Fourier distorter;
a dynamically alterable distortion parameter Fourier distorter.

8. The apparatus of claim 1 and further comprising at least one Fourier distorter disposed optically subsequent to the optical correlator.

9. The apparatus of claim 8 and further comprising at least one Fourier lens disposed optically subsequent to the at least one Fourier distorter.

10. The apparatus of claim 1 and further comprising a multiple wavelength photodetector array disposed optically subsequent to the optical correlator.

11. A method comprising:
receiving at least a first electrical signal from a first antenna;
receiving at least a second electrical signal from a second antenna;
converting the first electrical signal into a corresponding first optical signal having a first carrier wavelength and an intensity that corresponds, at least in part, to a characteristic of the first electrical signal;
converting the second electrical signal into a corresponding second optical signal having a second carrier wavelength that is different than the first carrier wavelength and having an intensity that corresponds, at least in part, to a characteristic of the second electrical signal;
simultaneously optically correlating a reference signal with each of the first optical signal and the second optical signal.

12. The method of claim 11 wherein converting the first electrical signal into a corresponding first optical signal comprises simultaneously converting a plurality of temporally differentiated samples of the first electrical signal into a corresponding plurality of temporally differentiated first optical signals.

13. The method of claim 12 wherein converting the second electrical signal into a corresponding second optical signal comprises simultaneously converting a plurality of temporally differentiated samples of the second electrical signal into a corresponding plurality of temporally differentiated second optical signals.

14. The method of claim 13 wherein converting the first electrical signal into a corresponding first optical signal and converting the second electrical signal into a corresponding second optical signal comprises simultaneously passing the plurality of temporally differentiated first optical signals and the plurality of temporally differentiated second optical signals through a least a first Fourier lens to provide a first and second Fourier transformed optical signal.

15. The method of claim 14 wherein converting the first electrical signal into a corresponding first optical signal and converting the second electrical signal into a corresponding second optical signal further comprises distorting at least one of the first and second Fourier transformed optical signals to provide at least one distorted Fourier transformed optical signal.

16. The method of claim 15 wherein distorting at least one of the first and second Fourier transformed optical signals comprises distorting at least one of the first and second Fourier transformed optical signals to thereby facilitate accurately correlating the optical signal that is distorted to the reference signal.

17. The method of claim 11 wherein simultaneously optically correlating a reference signal with each of the first optical signal and the second optical signal comprises providing a first correlation output signal as a function, at least in part, of how closely the first optical signal correlates to the reference signal and a second correlation output signal as a function, at least in part, of how closely the second optical signal correlates to the reference signal.

18. The method of claim 17 wherein the reference signal comprises a Fourier representation of a time-based signal.

19. The method of claim 17 and further comprising distorting at least one of the first and second correlation output signals to provide a distorted correlation output signal.

20. The method of claim 19 and further comprising converting the distorted correlation output signal out of the Fourier domain to provide a resultant correlation output signal.

21. The method of claim 20 and further comprising converting the resultant correlation output signal from an optical carrier to a corresponding electrical carrier.

22. The code division multiple access radio receiver comprising:
plurality of antennas;
at least a first dispreading code;
a multiple wavelenth optical correlator that is operably coupled to the plurality of antennas and the first spreading code;
wherein the multiple wavelength optical correlator comprises an emissive multiple wavelength spatial light modulator having an input operably coupled to the plurality of antennas and having a plurality of optical output signals, wherein each of the optical output signals has a carrier wavelength that is unique to a given one of the antennas.

23. The code division multiple access radio receiver of claim 22 and further comprising a substantially flat lens having unity transmittance and that is disposed optically upstream of a Fourier lens having an optical input disposed to receive the plurality of optical output signals and an output providing corresponding Fourier domain optical output signals.

24. The code division multiple access radio receiver of claim 23 and further comprising a first Fourier distorter having an optical input disposed to receive the Fourier domain optical output signals and an optical output that provides distorted Fourier domain optical output signals.

25. The code division multiple access radio receiver of claim 24 and further comprising an optical correlator filter having an optical input disposed to receive the distorted Fourier domain optical output signals and an optical output that provides a correlation result optical output signal for each of the plurality of optical output signals.

26. The code division multiple access radio receiver of claim 25 and further comprising a second Fourier distorter having an optical input disposed to receive the correlation result output signals and an output that provides corresponding Fourier domain de-distorted correlation result optical output signals.

27. The code division multiple access radio receiver of claim 26 and further comprising an inverse Fourier transformation lens having an optical input disposed to receive the Fourier domain restored correlation result optical output signals and an optical output that provides restored correlation result optical output signals.

28. The code division multiple access radio receiver of claim 27 and further comprising a multiple wavelength photodetector array having an optical input disposed to receive the restored correlation result optical output signals and an output comprising electrical signals that individually correspond to restored correlation result optical output signals for each of the plurality of antennas.

* * * * *